US012497937B2

(12) United States Patent
Hao et al.

(10) Patent No.: US 12,497,937 B2
(45) Date of Patent: Dec. 16, 2025

(54) INTAKE MANIFOLD WITH INTEGRATED FUEL RETURN PASSAGE

(71) Applicant: CUMMINS INC., Columbus, IN (US)

(72) Inventors: Zheng Hao, Wuhan (CN); Chuan Wang, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/863,097

(22) PCT Filed: May 25, 2023

(86) PCT No.: PCT/US2023/023560
§ 371 (c)(1),
(2) Date: Nov. 5, 2024

(87) PCT Pub. No.: WO2023/235227
PCT Pub. Date: Dec. 7, 2023

(65) Prior Publication Data

US 2025/0314223 A1 Oct. 9, 2025

(30) Foreign Application Priority Data

May 30, 2022 (CN) ......................... 202210601108.0

(51) Int. Cl.
*F02M 35/10* (2006.01)
*F02M 35/104* (2006.01)
*F02M 37/00* (2006.01)

(52) U.S. Cl.
CPC ...... *F02M 35/104* (2013.01); *F02M 37/0047* (2013.01)

(58) Field of Classification Search
CPC ............. F02M 35/104; F02M 37/0047; F02M 37/0052; F02M 37/0023
See application file for complete search history.

(56) References Cited

U.S. PATENT DOCUMENTS 5,022,371 A * 6/1991 Daly ................ F02M 35/10085 123/468
5,101,792 A 4/1992 Koch
(Continued)

FOREIGN PATENT DOCUMENTS

EP 0 261 855 A1 3/1988
EP 0 423 466 A1 4/1991
(Continued)

OTHER PUBLICATIONS

International Search Report and Written Opinion for PCT Application No. PCT/US2023/023560, dated Aug. 28, 2023.

*Primary Examiner* — Hung Q Nguyen
(74) *Attorney, Agent, or Firm* — Foley & Lardner LLP

(57) ABSTRACT

The application relates to an intake manifold integrated drain rifle. An intake manifold to reduce external fuel drain lines is provided. The intake manifold includes an intake manifold curved portion and a distribution portion in fluid communication with the intake manifold curved portion. The intake manifold includes a flange extending radially outward from the distribution portion. The flange includes an internal fuel passage system with a first end and a second end. The internal fuel passage system includes a plurality of inlet openings distributed between the first end and the second end of the internal fuel passage system and configured to receive excess fuel from a plurality fuel injectors. The internal fuel passage system includes an outlet opening between the first end and the second end of the internal fuel passage system and in excess fuel receiving communication with the plurality of inlet openings. The outlet opening is configured to distribute the excess fuel out of the internal fuel passage system.

20 Claims, 5 Drawing Sheets

(56) References Cited

U.S. PATENT DOCUMENTS

| | | | | | |
|---|---|---|---|---|---|
| 5,163,406 | A * | 11/1992 | Daly | ................ | F02M 35/10072<br>123/456 |
| 6,308,686 | B1 | 10/2001 | Mammarella et al. | | |
| 6,338,334 | B1 | 1/2002 | Ando | | |
| 6,742,489 | B2 | 6/2004 | Vichinsky | | |
| 6,840,221 | B1 | 1/2005 | Rowells et al. | | |
| 2005/0133009 | A1 | 6/2005 | Rowells et al. | | |
| 2019/0010899 | A1* | 1/2019 | Itagaki | ................. | F02M 55/025 |

FOREIGN PATENT DOCUMENTS

| | | | | |
|---|---|---|---|---|
| EP | 1 375 899 | A2 | 1/2004 | |
| JP | H07122419 | B2 * | 12/1995 | ....... F02M 35/10032 |
| WO | WO-9727393 | A1 * | 7/1997 | ........... F02M 69/465 |
| WO | WO-00/42314 | A1 | 7/2000 | |

* cited by examiner

INTAKE MANIFOLD WITH INTEGRATED FUEL RETURN PASSAGE

CROSS-REFERENCE TO RELATED PATENT APPLICATION

This application is the U.S. National Phase of PCT Application No. PCT/US2023/023560, filed May 25, 2023, which claims priority to and the benefit of Chinese Patent Application No. 202210601108.0, filed May 30, 2022, the content of which is herein incorporated by reference.

TECHNICAL FIELD

The present application relates generally to intake manifold for internal combustion engine systems.

BACKGROUND

Optimizing the configuration of the fuel drainage arrangement in an intake manifold can have a strong influence on the cost of manufacturing the intake manifold. More specifically, many engines today include excess parts due to separate fuel drain lines that incorporate separate connectors assembled to every fuel drain outlet. For instance, various designs separate the fuel drain lines and the intake manifold, which can increase the machining process and assembly complexity.

SUMMARY

At least one aspect is directed to an intake manifold. The intake manifold includes an intake manifold curved portion. The intake manifold includes a distribution portion in fluid communication with the intake manifold curved portion. The intake manifold includes a flange extending radially outward from the distribution portion. The flange includes an internal fuel passage system. The internal fuel passage system includes a first end and a second end. The internal fuel passage system includes a plurality of inlet openings distributed between the first end and the second end of the internal fuel passage system. The plurality of inlet openings are configured to receive excess fuel from a plurality fuel injectors. The internal fuel passage system includes an outlet opening between the first end and the second end of the internal fuel passage system and in excess fuel receiving communication with the plurality of inlet openings. The outlet opening are configured to distribute the excess fuel out of the internal fuel passage system.

In some embodiments, the intake manifold further comprises: a first opening defined by the first end of the internal fuel passage system; and a first plug coupled with the first end of the internal fuel passage system such that the first opening is sealed.

In some embodiments, the intake manifold further comprises: a second opening defined by the second end of the internal fuel passage system; and a second plug coupled with the second end of the internal fuel passage system such that the second opening is sealed.

In some embodiments, the intake manifold further comprises: a first opening defined by the first end of the internal fuel passage system, the first opening being internally threaded; and an externally threaded first plug comprising a seal member, the externally threaded first plug threadedly coupled with the first opening of the internal fuel passage system such that the seal member engages with a flat circumferential end surface of the first end of the internal fuel passage system.

In some embodiments, the intake manifold further comprises: a second opening defined by the second end of the internal fuel passage system, the second opening being internally threaded; and an externally threaded second plug comprising a seal member, the externally threaded second plug threadedly coupled with the second opening of the internal fuel passage system such that the seal member of the externally threaded second plug engages with a flat circumferential end surface of the second end of the internal fuel passage system.

In some embodiments, the plurality of inlet openings of the internal fuel passage system each have substantially the same diameter.

In some embodiments, the plurality of inlet openings of the internal fuel passage system is six inlet openings.

In some embodiments, the intake manifold further comprises a drain line fluidly coupled with the outlet opening of the internal fuel passage system.

In some embodiments, the outlet opening of the internal fuel passage system is positioned between two of the plurality of inlet openings of the internal fuel passage system.

In some embodiments, the plurality of inlet openings of the internal fuel passage system is six inlet openings and the outlet opening of the internal fuel passage system is positioned between the first inlet opening and the sixth inlet opening.

At least one aspect is directed to an internal combustion engine system. The internal combustion engine system includes a combustion chamber. The combustion chamber includes one or more cylinders and one or more pistons. The one or more cylinders can each include a cylinder head. The cylinder heads can each include an intake port. The one or more pistons can each correspond to one of the one or more cylinders. Each of the one or more pistons are coupled with a connecting rod and a crankshaft. The internal combustion engine system includes one or more fuel injectors coupled with the cylinder head. The one or more fuel injectors are configured to provide fuel into the cylinder head via the intake port. The internal combustion engine system includes an intake manifold. The intake manifold includes an intake manifold curved portion. The intake manifold includes a distribution portion in fluid communication with the intake manifold curved portion and the intake port of the cylinder of each combustion chamber. The distribution portion is configured to provide air into the cylinder head via the intake port. The intake manifold includes a flange extending radially outward from the distribution portion. The flange includes an internal fuel passage system. The internal fuel passage system includes a first end and a second end. The internal fuel passage system includes a plurality of inlet openings distributed between the first end and the second end of the internal fuel passage system each in excess fuel receiving communication with the one or more fuel injectors. The internal fuel passage system includes an outlet opening between the first end and the second end of the internal fuel passage system and in excess fuel receiving communication with the plurality of inlet openings. The outlet opening is configured to distribute the excess fuel out of the internal fuel passage system.

At least one aspect is directed to an internal combustion engine system comprising one or more cylinders each comprising a cylinder head having an intake port; one or more pistons each one corresponding to one of the one or more cylinders, each of the one or more pistons coupled with a connecting rod and a crankshaft; one or more fuel injectors coupled with the cylinder head configured to provide fuel into the cylinder head via the intake port; and an intake manifold. The intake manifold comprises: an intake manifold curved portion; a distribution portion in fluid communication with the intake manifold curved portion and the intake port of the cylinder head of each of the one or more cylinders, the distribution portion configured to provide air into the cylinder head via the intake port; and a flange extending radially outward from the distribution portion. The flange having an internal fuel passage system comprising a first end and a second end and defines therein: a plurality of inlet openings distributed between the first end and the second end of the internal fuel passage system each in excess fuel receiving communication with the one or more fuel injectors, and an outlet opening between the first end and the second end of the internal fuel passage system and in excess fuel receiving communication with the plurality of inlet openings, the outlet opening configured to distribute the excess fuel out of the internal fuel passage system.

In some embodiments, the internal combustion engine system further comprises a fuel injection system comprising: a fuel pump configured to receive and pressurize a portion of fuel from a fuel source; a common fuel rail in pressurized fuel receiving communication with the fuel pump; and the one or more fuel injectors coupled with the common fuel rail, the one or more fuel injectors in pressurized fuel receiving communication with the common fuel rail.

In some embodiments, the internal combustion engine system further comprises one or more fuel injector drain ports positioned between the fuel injection system and the plurality of inlet openings, the one or more fuel injector drain ports in excess fuel receiving communication with the fuel injection system and in excess fuel providing communication with the plurality of inlet openings.

In some embodiments, the plurality of inlet openings comprises six inlet openings, each of the six inlet openings is in excess fuel receiving communication with one fuel injector of the one or more fuel injectors.

In some embodiments, the one or more fuel injectors is two fuel injectors.

In some embodiments, the internal fuel passage system of the flange further comprises a second outlet opening between the first end and the second end of the flange, the second outlet opening in excess fuel receiving communication with the plurality of inlet openings, the second outlet opening configured to distribute the excess fuel out of the internal fuel passage system.

In some embodiments, the plurality of inlet openings of the internal fuel passage system is six inlet openings and the outlet opening of the internal fuel passage system is positioned between the first inlet opening and the sixth inlet opening.

In some embodiments, the plurality of inlet openings of the internal fuel passage system have substantially the same diameter; and the outlet opening of the internal fuel passage system has a diameter larger than the diameters of the plurality of inlet openings of the internal fuel passage system.

In some embodiments, the internal combustion engine system further comprises a drain line fluidly coupled with the outlet opening of the internal fuel passage system, the drain line in excess fuel receiving communication with the outlet opening and configured to redistribute the excess fuel to a plurality of additional components.

In some embodiments, the internal combustion engine system further comprises a drain line fluidly coupled with the outlet opening of the internal fuel passage system, the drain line in excess fuel receiving communication with the outlet opening and configured to provide the excess fuel to a storage tank.

DETAILED DESCRIPTION

Following below are more detailed descriptions of various concepts related to, and implementations of, methods, apparatuses, and systems to improve the manufacturing process of intake manifold systems within an engine system. Various embodiments of the present invention provide the benefit of not requiring a manual connection of each fuel drain line from the fuel injection system to the intake manifold via quick connectors. For example, various embodiments presented herein can eliminate the need to individually connect each fuel drain line because the fuel drain system can be internally integrated into the intake manifold during the manufacturing process. The implementation of various embodiments presented herein can reduce equipment required for a fuel drain assembly, such as quick connectors, which reduces cost. Also, the implementations of various embodiments presented herein can reduce manufacturing and assembly time, which reduces cost.

Before turning to the figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

Referring to the Figures generally, systems and methods for improving the structure of an intake manifold to be integrated with an internal fuel passage system is provided. A fuel drain rifle integrated into an intake manifold, in accordance with various embodiments, can provide for a simpler layout and assembly, thus saving cost, machining time, and assembly time.

Figure 1:
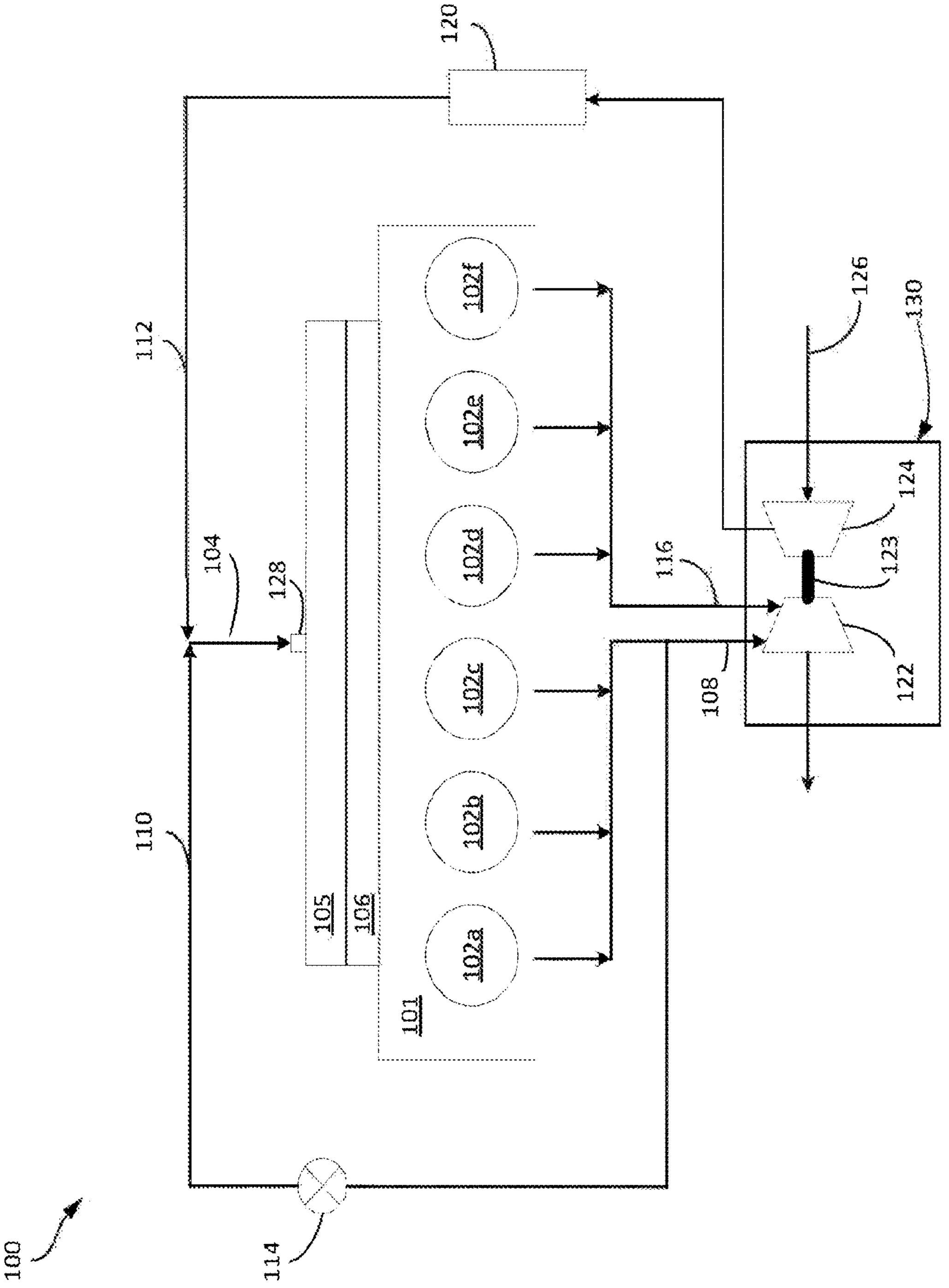
FIG. 1 is a diagram of an internal combustion engine system, according to an exemplary embodiment.

FIG. 1 is a diagram of an example internal combustion engine system 100. The internal combustion engine system 100 includes an engine 101. The engine 101 can be an internal combustion engine of any type, and can comprise, for example, a diesel engine, a gasoline engine, a natural gas engine, a bi-fuel engine, etc.

The internal combustion engine system 100 includes one or more cylinders 102*a*, 102*b*, 102*c*, 102*d*, 102*e*, and 102*f*, collectively referred to as cylinders 102. The cylinders 102 can be a part of the engine 101. The number of cylinders 102 can be any number suitable for an engine. The arrangement of the cylinders 102 can be any suitable arrangements for the engine, although six cylinders with in-line arrangement are depicted in FIG. 1 according to an example embodiment.

The internal combustion engine system 100 includes a turbine 122, a shaft 123, and a compressor 124 which together form a turbocharger 130. The turbine 122 may have a split turbo housing to receive exhaust flows from at least one exhaust conduit. The turbine 122 is connected via the shaft 123 to the compressor 124. The turbocharger 130 may be any suitable twin entry turbocharger, including but not limited to symmetric waste-gated turbochargers, asymmetric waste-gated turbochargers, and variable geometry turbine turbochargers. In some embodiments, the turbocharger 130 may be a combination of two or more turbochargers.

The internal combustion engine system 100 includes a first exhaust conduit 108 and a second exhaust conduit 116. The turbine 122 can receive exhaust flows from both the first exhaust conduit 108 and the second exhaust conduit 116. The turbine 122 is driven by the received exhaust flow from the first exhaust conduit 108 and the second exhaust conduit 116. For example, the turbine 122 can drive the compressor 124 via the shaft 123 from the exhaust flow from the first exhaust conduit 108 and the second exhaust conduit 116.

The internal combustion engine system 100 includes a charge air conduit 112. The compressor 124 can compress fresh air 126 from ambient into the charge air conduit 112. The charge air conduit 112 is in line with a charge air cooler 120. For example, the charge air cooler 120 can cool the compressed fresh air supplied by the compressor 124.

The internal combustion engine system 100 includes an intake conduit 104 and an intake manifold 106 to receive a fluid. For example, the charge air conduit 112 can direct the (cooled) fresh air flow into the intake conduit 104, which in turn can provide the fresh air flow to the intake manifold 106. The intake manifold 106 can provide fluid to the cylinders 102. For example, the intake manifold 106 provides the fresh air flow to the cylinders 102.

The internal combustion engine system 100 includes a fuel injection system 105. An example fuel injection system 105 is discussed in the context of FIG. 5 below.

The cylinders 102 can provide exhaust flow to one or more exhaust conduits (e.g. a first exhaust conduit 108 and a second exhaust conduit 116). In some embodiments, the cylinders 102 can be connected to an exhaust manifold to receive exhaust from the cylinders 102 and direct exhaust to the first exhaust conduit 108 and the second exhaust conduit 116. In some embodiments, the first exhaust conduit 108 and the second exhaust conduit 116 can be connected to the cylinders 102 without an exhaust manifold. The first exhaust conduit 108 can be connected to a first set of cylinders 102 (e.g., cylinders 102*a*, 102*b*, and 102*c*). The second exhaust conduit 116 can be connected to a second set of cylinders 102 (e.g., 102*d*, 102*e*, and 102*f*).

The internal combustion engine system 100 includes an exhaust gas recirculation (EGR) conduit 110. The EGR conduit 110 is fluidly connected to the first exhaust conduit 108. For example, the first exhaust conduit 108 can direct a portion of exhaust flow from the cylinders 102 to the EGR conduit 110. The first exhaust conduit 108 can direct another portion of exhaust flow from the cylinders 102 to the turbine 122. The second exhaust conduit 116 can direct all exhaust flow from the cylinders 102 to the turbine 122. The EGR conduit 110 can receive exhaust flow from the first exhaust conduit 108 and direct the exhaust flow into the intake conduit 104.

The internal combustion engine system 100 includes an EGR valve 114. For example, the EGR valve 114 can be disposed in line with the EGR conduit 110. In various embodiments, the EGR valve 114 is an on/off valve that is controlled by a controller (not shown) to fully open for passing EGR flow or fully close for blocking EGR flow. The exhaust flow in the EGR conduit 110 and the fresh air flow in the charge air conduit 112 are joined as an intake flow into the intake conduit 104. The intake flow is directed into the intake manifold 106.

In some embodiments, the internal combustion engine system 100 includes a mixer 128 disposed in line with the intake conduit 104 for mixing the joined fresh air flow and exhaust flow. The mixed intake flow is further directed into the intake manifold 106. The intake manifold 106 is connected to the cylinders 102 and can direct the mixed intake flow to the cylinders 102.

Figure 2:
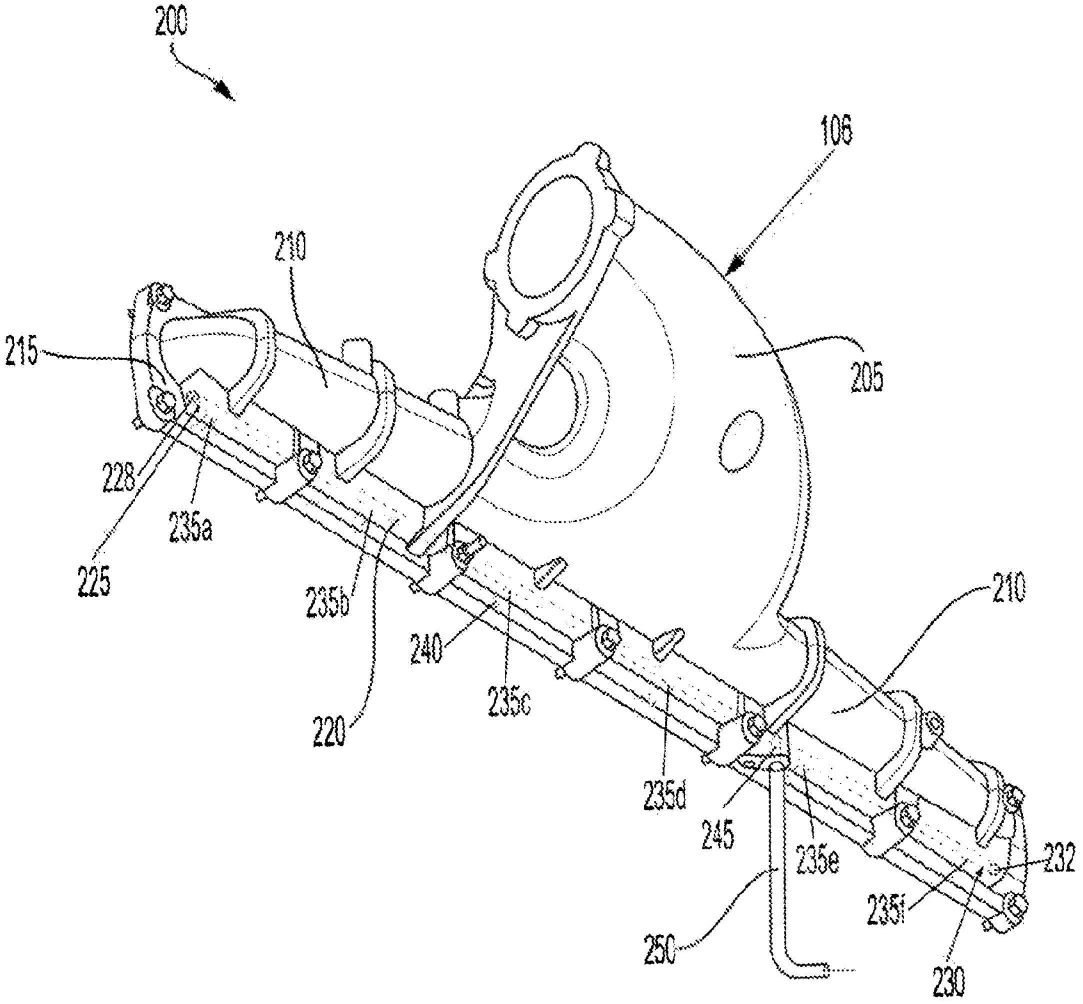
FIG. 2 depicts a perspective view of an intake manifold system having an internal fuel passage system, according to an exemplary embodiment.
Figure 3:
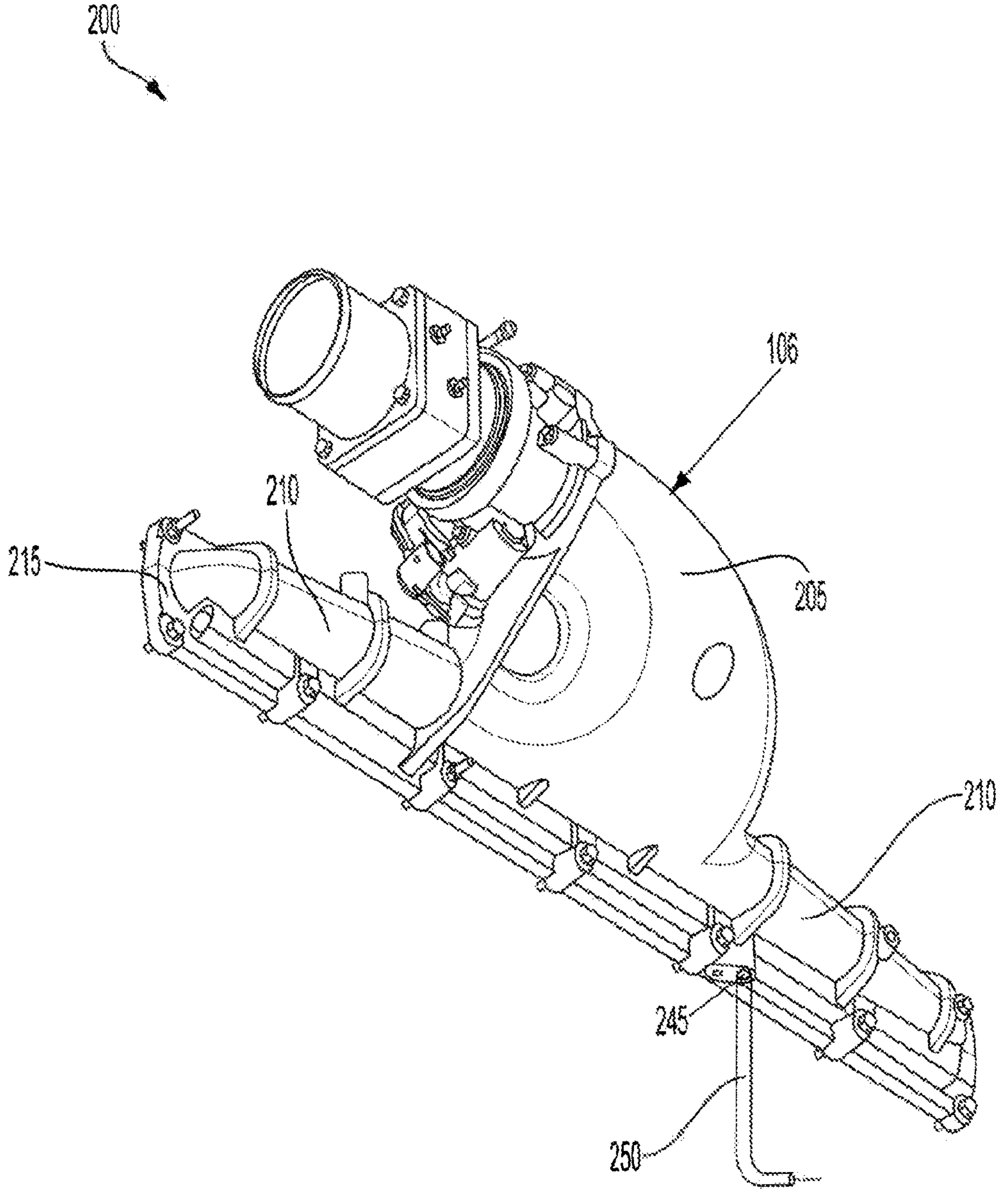
FIG. 3 depicts an external-only view of the intake manifold system depicted in FIG. 2.

FIG. 2 and FIG. 3 depict a perspective view of an intake manifold system 200, according to an example embodiment. FIG. 2 includes an illustration of an internal fuel passage system 220 within the intake manifold 106. FIG. 3 depicts an external-only view of the intake manifold system 200 depicted in FIG. 2. The intake manifold 106 includes an intake manifold curved portion 205. The intake manifold curved portion 205 is in fluid communication with the EGR conduit 110 and the charge air conduit 112. For example, the intake manifold curved portion 205 can receive exhaust low from the EGR conduit 110 and/or fresh air flow from the charge air conduit 112.

The intake manifold 106 includes a distribution portion 210. The distribution portion 210 is in fluid communication with the intake manifold curved portion 205. For example, the distribution portion 210 can receive the fresh air flow from the intake manifold curved portion 205 and/or the mixture of fresh air flow and exhaust flow from the intake manifold curved portion 205.

The intake manifold 106 includes a flange 215. The flange 215 can extend radially outward from the distribution portion 210. The flange 215 does not have to be in fluid communication with the distribution portion 210. For example, the flange 215 can be fluidly isolated from the distribution portion 210.

The intake manifold 106 includes an internal fuel passage system 220. The internal fuel passage system 220 can be a part of the flange 215, i.e., the flange 215 can have the internal fuel passage system 220. The internal fuel passage system 220 is in fluid communication with other components of the internal combustion engine system 100. The internal fuel passage system 220 can be made of the same material as the intake manifold 106. For example, the internal fuel passage system 220 can be made of steel. The internal fuel passage system 220 does not have to be made of the same material as the intake manifold 106. For example, the intake manifold 106 can be made of steel and the internal fuel passage system 220 can be made of a high-performance polymer or composite.

The internal fuel passage system 220 includes a first end 225. A first opening 228 is defined by the first end 225 of the internal fuel passage system 220. The internal fuel passage system 220 includes a second end 230. A second opening 232 is defined by the second end 230 of the internal fuel passage system 220. The intake manifold 106 can be manufactured with the internal fuel passage system 220. For example, the flange 215 can have the internal fuel passage system 220 comprising the first end 225 and the second end 230. Further, the internal fuel passage system 220 can be manufactured with a first opening 228 and a second opening 232 such that fluid or other matter can pass through the openings 228, 232.

The internal fuel passage system 220 includes one or more inlet openings 235*a*, 235*b*, 235*c*, 235*d*, 235*e*, and 235*f*, collectively referred to as inlet openings 235. For example, the internal fuel passage system 220 can include a plurality inlet openings 235. The inlet openings 235 are distributed between the first end 225 and the second end 230 of the internal fuel passage system 220. The number of inlet openings 235 can be any number suitable for an engine. For example, the number of inlet openings 235 can be six inlet openings. For example, the number of inlet openings 235 can be the same number as cylinders 102. The inlet openings 235 are in fluid receiving communication with other components of the internal combustion engine system 100. For example, the plurality of inlet openings 235 can be configured to receive excess fuel from a plurality fuel injectors, as discussed more below. The inlet openings 235 can each include a fuel receiver line 240. The fuel receiver line 240 is in fluid communication with other components of the internal combustion engine system 100, as discussed in more detail below.

The internal fuel passage system 220 includes one or more outlet openings 245. For example, the internal fuel passage system 220 can include one outlet opening 245. The outlet opening 245 is positioned between the first end 225 and the second end 230 of the internal fuel passage system 220. For example, the outlet opening 245 can be positioned between the first inlet opening 235*a* and the sixth inlet opening 235*f*. The outlet opening 245 is in fluid receiving communication with the inlet openings 235. For example, the outlet opening 245 is in excess fuel receiving communication with the plurality of inlet openings 235. The internal fuel passage system 220 can include two outlet openings 245. For example, the two outlet openings 245 can both be positioned between the first end 225 and the second end 230. For example, the two outlet openings 245 can both be positioned between the first inlet opening 235*a* and the sixth inlet opening 235*f*. For example, a second outlet opening 245 can be between the first end 225 and the second end 230 of the internal fuel passage system 220. The two outlet openings 245 can both be in fluid receiving communication with the inlet openings 235. The outlet opening 245 is configured to distribute the excess fuel out of the internal fuel passage system 220, as discussed below.

The intake manifold system 200 includes one or more drain lines 250. For example, the one or more drain lines 250 can be one drain line 250. The drain line 250 can be part of the intake manifold 106. The drain line 250 is fluidly coupled with the outlet opening 245 of the internal fuel passage system 220. The drain line 250 is in fluid receiving communication with the outlet opening 245. For example, the drain line 250 can distribute fluid out of the internal fuel passage system 220. The drain line 250 is fluidly coupled with the two outlet openings 245. The drain line 250 is in fluid receiving communication with the two outlet openings 245. The drain line 250 can be two drain lines 250 such that each is in fluid receiving communication with each of the two outlet openings 245. For example, the two drain lines 250 can distribute fluid out of the internal fuel passage system 220. For example, the one or more drain lines 250 can provide excess fuel to a storage tank of the internal combustion engine system 100. The one or more drain lines 250 can redistribute fluid to a plurality of additional components of the internal combustion engine system 100. For example, the one or more drain lines 250 can redistribute excess fuel to a plurality of additional components of the internal combustion engine system 100.

The inlet openings 235 can be added to the internal fuel passage system 220 during the manufacturing process. For example, the inlet openings 235 can be drilled into the internal fuel passage system 220. The inlet openings 235 can have substantially the same diameter. For example, the inlet openings 235 can be drilled into the internal fuel passage system 220 with the same drill bit such that the inlet openings 235 have substantially the same diameter. The one or more outlet openings 245 can have substantially the same diameter as the inlet openings 235. The one or more outlet openings 245 can have a diameter that is larger than the inlet openings 235. The matter left in the internal fuel passage system 220 after the inlet openings 235 are drilled can be expelled through the first opening 228 and the second opening 232.

Figure 4:
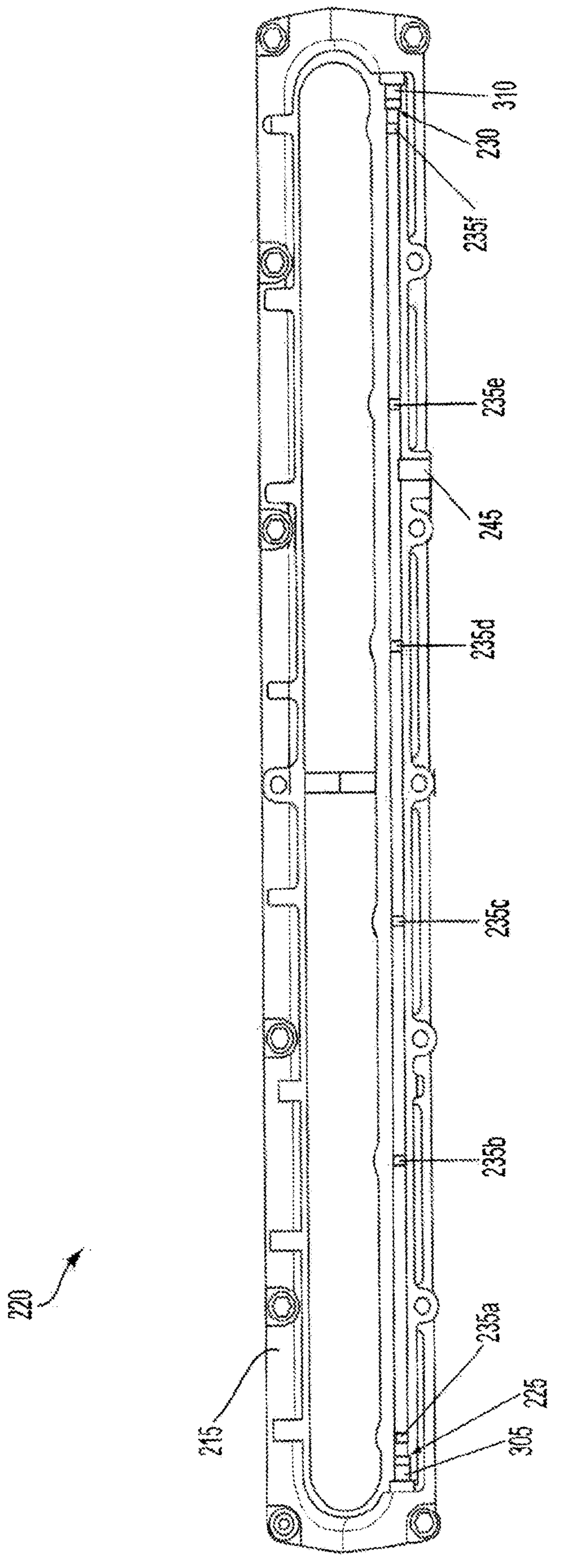
FIG. 4 depicts a perspective view of the internal fuel passage system within the intake manifold of FIG. 2.

FIG. 4 depicts a perspective view of the internal fuel passage system 220 within the intake manifold 106 of FIG. 2. The internal fuel passage system 220 includes a first plug 305 and a second plug 310. The first plug 305 is coupled with the first opening 228 of the first end 225 of the internal fuel passage system 220 such that the first opening 228 is sealed. The second plug 310 is coupled with the second opening 232 of the second end 230 of the internal fuel passage system 220 such that the second opening 232 is sealed. For example, the first plug 305 and the second plug 310 can be coupled with the first opening 228 and the second opening 232, respectively, such that the first opening 228 and the second opening 232 are sealed. For example, the first opening 228 and the second opening 232 can be sealed such that fluid (e.g., excess fuel) does not leak or escape from them. The first plug 305 and the second plug 310 can include seal members, for example o-ring seal members. The seal members of the first plug 305 and the second plug 310 can engage with a flat circumferential end surface of the first end 225 and second end 230 of the internal fuel passage system 220. For example, the seal members of the first plug 305 and the second plug 310 can engage with the flat circumferential end surfaces of the first end 225 and second end 230 to provide a more effective means for prohibiting fluid to leak from the first opening 228 and the second opening 232.

The first plug 305 and the second plug 310 can be threadedly coupled with the first opening 228 and the second opening 232, respectively, of the internal fuel passage system 220 such that the seal member engages with the flat circumferential end surface of the first end 225 and second end 230 of the internal fuel passage system 220, respectively. For example, the first plug 305 and the second plug 310 can be externally threaded and the first opening 228 and the second opening 232 can be internally threaded. In this case, the first plug 305 and the first opening 228, and the second plug 310 and the second opening 232 can be threadedly coupled by aligning the threads and twisting the plugs 305, 310. The first plug 305 and the second plug 310 do not need to be threaded. For example, the first plug 305 and the second plug 310 can be coupled with the first opening 228 and the second opening 232 by fitting over the first end 225 and the second end 230. For example, the first plug 305 and the second plug 310 can overlap the first end 225 and the second end 230, respectively, such that fluid is prohibited from exiting the first opening 228 and the second opening 232.

The first plug 305 and the second plug 310 are coupled with the first opening 228 and the second opening 232, respectively. For example, the first plug 305 and the second plug 310 can be coupled with the first opening 228 and the second opening 232, respectively, after the inlet openings

235 have been added or drilled and the internal fuel passage system 220 has been cleaned of debris.

Figure 5:
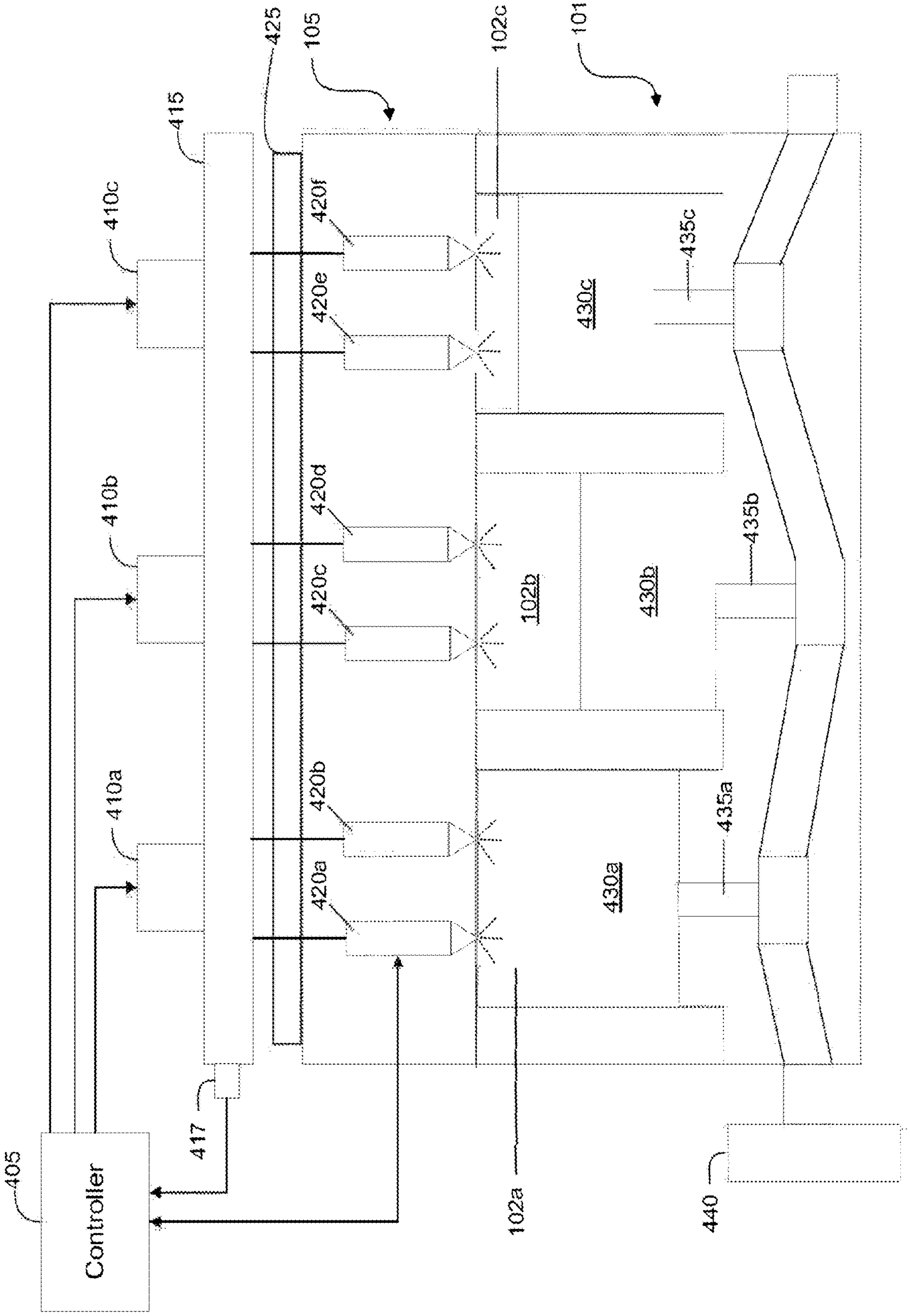
FIG. 5 is a diagram of a fuel injection system and an engine, according to an exemplary embodiment.

FIG. 5 is a diagram of a fuel injection system 105 and an engine 101, according to an example embodiment. The fuel injection system 105 and the engine 101 can be a portion of the internal combustion engine system 100 of FIG. 1. The fuel injection system 105 can deliver fuel to a combustion chamber to facilitate combustion in order to power the engine 101.

The fuel injection system 105 includes a controller 405 and a pressure sensor 417. The pressure sensor 417 can provide pressure measurement signals. The controller 405 can control the rate of fuel injection of the fuel injection system 105. For example, the controller 405 can determine the quantity of fuel injected by the fuel injection system 105. For example, the controller 405 can determine the quantity of fuel injected into the engine 101 based on the pressure measurement signals provided by the pressure sensor 417. Based on the determination of the quantity of fuel injected into the engine 101, the controller 405 can determine what fuel injection quantities are appropriate to meet the needs of the engine 101 and control the fuel injection system 105 to inject the appropriate fuel quantities into the engine 101.

The fuel injection system 105 includes at least one fuel pump 410. For example, the fuel injection system 105 can include three fuel pumps 410*a*, 410*b*, and 410*c*. The number of fuel pumps 410 can be any number suitable for an engine. The fuel pumps 410 can be high pressure pumps. For example, the fuel pumps 410 can be configured to receive and pressurize a portion of the fuel from the fuel source.

The fuel injection system 105 includes a common fuel rail 415 and one or more fuel injectors 420*a*-420*f*, collectively referred to as fuel injectors 420. The common fuel rail 415 is in fluid receiving communication with the fuel pumps 410. For example, the common fuel rail 415 can be in pressurized fuel receiving communication with the fuel pumps 410. The common fuel rail 415 is in fluid providing communication with the fuel injectors 420. For example, the fuel injectors 420 can be in pressurized fuel receiving communication with the common fuel rail 415. The fuel injectors 420 are coupled with the common fuel rail 415. For example, the fuel pumps 410 can provide the pressurized fuel to the fuel injectors 420 through the common fuel rail 415. The fuel injection system 105 does not need to include the common fuel rail 415. For example, the fuel injectors 420 can be in direct fluid receiving communication with the fuel pumps 410. For example, the fuel pumps 410 can provide the pressurized fuel to the fuel injectors 420.

The fuel injection system 105 includes one or more fuel injector drain ports 425. The one or more fuel injector drain ports 425 are positioned between the fuel injection system 105 and the inlet openings 235. The one or more fuel injector drain ports 425 are in excess fuel receiving communication with the fuel injection system 105. For example, the one or more fuel injector drain ports 425 can receive excess fuel from the fuel injectors 420. The one or more fuel injector drain ports 425 are in excess fuel providing communication with the inlet openings 235. For example, the one or more fuel injector drain ports 425 can provide excess fuel from the fuel injectors 420 to the inlet openings 235. The inlet openings 235 are in fluid receiving communication with other components of the internal combustion engine system 100. For example, the inlet openings 235 can receive excess fuel from the fuel injectors 420.

The number of fuel injector drain ports 425 can be any number suitable for an engine. For example, the number of fuel injector drain ports 425 can match the number of inlet openings 235. For example, the number of fuel injector drain ports 425 can match the number of fuel injectors 420. For example, the number of fuel injector drain ports 425 can match the number of inlet openings 235 and the number of fuel injectors 420. For example, the number of fuel injector drain ports 425, inlet openings 235, and fuel injectors 420 can be six. Further, each of the six inlet openings 235*a*-235*f* can be in excess fuel receiving communication with one fuel injector of the fuel injectors 420*a*-420*f*. Further still, each of the six inlet openings 235*a*-235*f* can be in excess fuel receiving communication with two fuel injectors of the fuel injectors 420*a*-420*f*, such that there are twelve fuel injectors 420.

The engine 101 includes one or more pistons 430*a*-430*c*, collectively referred to as pistons 430. One of each of the cylinders 102 and the pistons 430 are part of a combustion chamber. For example, there can be three combustion chambers, each combustion chamber includes a cylinder 102 and a piston 430. The pistons 430 can reciprocate under power provided by fuel combustion thereby causing a crankshaft 440 to rotate via one or more corresponding connecting rods 435*a*-435*c*, collectively referred to as connecting rods 435. The connecting rods 435 can join the pistons 430 to the crankshaft 440. The cylinders 102 can each include a cylinder head (not shown) and an intake port (not shown). The cylinders 102 can each include a cylinder head at one end and can be open at the other end. For example, the cylinders 102 can be open at one end to permit free oscillation of the connecting rods 435. The cylinders 102 can be made of cast iron, steel, or aluminum.

The fuel injectors 420 can deliver fuel to the cylinders 102 during specific times of the engine cycle. For example, the fuel injectors 420 can deliver fuel to the cylinders 102 during specific times of the engine cycle as directed by the controller 405. Each of the fuel injectors 420*a*-420*f* can correspond with each of the cylinders 102*a*-102*f* and each of the pistons. The cylinders 102 can each include a cylinder head. The cylinders 102 can each include an intake port. The intake port can be in fluid providing communication with the cylinder head. Each of the fuel injectors 420*a*-420*f* can be coupled with and in fluid providing communication with each cylinder head of each of the cylinders 102*a*-102*f*, respectively. For example, each of the fuel injectors 420*a*-420*f* can provide fuel into each of the cylinder heads of each of the cylinders 102*a*-102*f*, respectively, via each of the intake ports of the cylinders 102*a*-102*f*, respectively.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A "coupled" to circuit B may signify that the circuit A communicates directly with circuit B (i.e., no intermediary) or communicates indirectly with circuit B (e.g., through one or more intermediaries).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An intake manifold comprising:

an intake manifold curved portion;

a distribution portion in fluid communication with the intake manifold curved portion; and a flange extending radially outward from the distribution portion, the flange having an internal fuel passage system comprising a first end and a second end and defining therein:

a first opening defined by the first end and a second opening defined by the second, the first opening is in fluid communication with the second opening;

a plurality of inlet openings distributed between the first opening and the second opening of the internal fuel passage system, the plurality of inlet openings configured to receive excess fuel from a plurality fuel injectors; and an outlet opening between the first opening and the second opening of the internal fuel passage system and in excess fuel receiving communication with the plurality of inlet openings, the outlet opening configured to distribute the excess fuel out of the internal fuel passage system.

2. The intake manifold of claim 1, further comprising:

a first plug coupled with the first end of the internal fuel passage system such that the first opening is sealed.

3. The intake manifold of claim 2, further comprising:

a second plug coupled with the second end of the internal fuel passage system such that the second opening is sealed.

4. The intake manifold of claim 1, wherein the first opening defined by the first end of the internal fuel passage system is internally threaded and further comprises:

an externally threaded first plug comprising a seal member, the externally threaded first plug threadedly coupled with the first opening of the internal fuel passage system such that the seal member engages with a flat circumferential end surface of the first end of the internal fuel passage system.

5. The intake manifold of claim 4, wherein the second opening defined by the second end of the internal fuel passage system is internally threaded and further comprises:

an externally threaded second plug comprising a seal member, the externally threaded second plug threadedly coupled with the second opening of the internal fuel passage system such that the seal member of the externally threaded second plug engages with a flat circumferential end surface of the second end of the internal fuel passage system.

6. The intake manifold of claim 1, wherein the plurality of inlet openings of the internal fuel passage system each have substantially the same diameter.

7. The intake manifold of claim 1, wherein the plurality of inlet openings of the internal fuel passage system is six inlet openings.

8. The intake manifold of claim 1, further comprising a drain line fluidly coupled with the outlet opening of the internal fuel passage system.

9. The intake manifold of claim 1, wherein the outlet opening of the internal fuel passage system is positioned between two of the plurality of inlet openings of the internal fuel passage system.

10. The intake manifold of claim 1, wherein the plurality of inlet openings of the internal fuel passage system is six inlet openings and the outlet opening of the internal fuel passage system is positioned between the first inlet opening and the sixth inlet opening.

11. An internal combustion engine system comprising:

one or more cylinders each comprising a cylinder head having an intake port;

one or more pistons each one corresponding to one of the one or more cylinders, each of the one or more pistons coupled with a connecting rod and a crankshaft;

one or more fuel injectors coupled with the cylinder head configured to provide fuel into the cylinder head via the intake port; and an intake manifold comprising:

an intake manifold curved portion;

a distribution portion in fluid communication with the intake manifold curved portion and the intake port of the cylinder head of each of the one or more cylinders, the distribution portion configured to provide air into the cylinder head via the intake port; and a flange extending radially outward from the distribution portion, the flange having an internal fuel passage system comprising a first end and a second end and defining therein:

a first opening defined by the first end and a second opening defined by the second, the first opening is in fluid communication with the second opening;

a plurality of inlet openings distributed between the first end and the second end of the internal fuel passage system each in excess fuel receiving communication with the one or more fuel injectors, and an outlet opening between the first opening and the second opening of the internal fuel passage system and in excess fuel receiving communication with the plurality of inlet openings, the outlet opening configured to distribute the excess fuel out of the internal fuel passage system.

12. The internal combustion engine system of claim 11, further comprising:

a fuel injection system comprising:

a fuel pump configured to receive and pressurize a portion of fuel from a fuel source;

a common fuel rail in pressurized fuel receiving communication with the fuel pump; and the one or more fuel injectors coupled with the common fuel rail, the one or more fuel injectors in pressurized fuel receiving communication with the common fuel rail.

13. The internal combustion engine system of claim 12, further comprising:

one or more fuel injector drain ports positioned between the fuel injection system and the plurality of inlet openings, the one or more fuel injector drain ports in excess fuel receiving communication with the fuel injection system and in excess fuel providing communication with the plurality of inlet openings.

14. The internal combustion engine system of claim 11, wherein the plurality of inlet openings comprises six inlet openings, each of the six inlet openings is in excess fuel receiving communication with one fuel injector of the one or more fuel injectors.

15. The internal combustion engine system of claim 11, wherein the one or more fuel injectors is two fuel injectors.

16. The internal combustion engine system of claim 15, wherein the internal fuel passage system of the flange further comprises:

a second outlet opening between the first end and the second end of the internal fuel passage system, the second outlet opening in excess fuel receiving communication with the plurality of inlet openings, the second outlet opening configured to distribute the excess fuel out of the internal fuel passage system.

17. The internal combustion engine system of claim 11, wherein the plurality of inlet openings of the internal fuel passage system is six inlet openings and the outlet opening of the internal fuel passage system is positioned between the first inlet opening and the sixth inlet opening.

18. The internal combustion engine system of claim 11, wherein:

the plurality of inlet openings of the internal fuel passage system have substantially the same diameter; and the outlet opening of the internal fuel passage system has a diameter larger than the diameters of the plurality of inlet openings of the internal fuel passage system.

19. The internal combustion engine system of claim 11, further comprising a drain line fluidly coupled with the outlet opening of the internal fuel passage system, the drain line in excess fuel receiving communication with the outlet opening and configured to redistribute the excess fuel to a plurality of additional components.

20. The internal combustion engine system of claim 11, further comprising a drain line fluidly coupled with the outlet opening of the internal fuel passage system, the drain line in excess fuel receiving communication with the outlet opening and configured to provide the excess fuel to a storage tank.

* * * * *